(12) United States Patent
Honda

(10) Patent No.: US 7,462,305 B2
(45) Date of Patent: Dec. 9, 2008

(54) OPTICAL SHEET MANUFACTURING METHOD AND OPTICAL SHEET

(75) Inventor: Makoto Honda, Shinjuku-Ku (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 626 days.

(21) Appl. No.: 10/522,301

(22) PCT Filed: May 21, 2004

(86) PCT No.: PCT/JP2004/006964
§ 371 (c)(1),
(2), (4) Date: Jan. 25, 2005

(87) PCT Pub. No.: WO2004/103683
PCT Pub. Date: Dec. 2, 2004

(65) Prior Publication Data
US 2006/0062969 A1 Mar. 23, 2006

(30) Foreign Application Priority Data
May 23, 2003 (JP) ............... 2003-145786

(51) Int. Cl.
B29D 7/01 (2006.01)
B29D 11/00 (2006.01)

(52) U.S. Cl. .......... 264/1.32; 264/1.34; 264/1.36; 264/1.7

(58) Field of Classification Search .......... 428/156, 428/172, 913.3; 239/237, 455, 457, 459, 239/566; 264/1.32, 1.34, 1.36, 1.7
See application file for complete search history.

(56) References Cited
U.S. PATENT DOCUMENTS
5,714,218 A * 2/1998 Nishio et al. ............ 428/64.1

2002/0119298 A1 * 8/2002 Sugawa et al. ............ 428/220

FOREIGN PATENT DOCUMENTS

| JP | 1-159627 | 6/1989 |
| JP | 3-127041 | 5/1991 |
| JP | 4-295839 | 10/1992 |
| JP | 4-299329 | 10/1992 |
| JP | 11-147255 | 6/1999 |
| JP | 2002-236203 | 8/2002 |

* cited by examiner

Primary Examiner—Donald Loney
(74) Attorney, Agent, or Firm—Oliff & Berridge, PLC

(57) ABSTRACT

A rigid optical sheet manufacturing method capable of manufacturing an optical sheet at high productivity and low manufacturing costs, and an optical sheet are provided. An optical sheet 1 includes a transparent thermoplastic resin base 2 formed of a thermoplastic resin that is rigid at temperatures not higher than its glass transition point, and a first optical structure 3 formed on one of the surfaces of the thermoplastic resin base 2. The first optical structure 3 is formed by pressing a material for forming the first optical structure 3 together with the flexible thermoplastic resin base 2 having a surface temperature not higher than the glass transition point and an internal temperature not lower than the glass transition point by a radiation-curable resin shaping roller 14. Preferably, the material forming the first optical structure 3 is a radiation-curable resin. Preferably, a film 6 having high adhesion to both the thermoplastic resin and the radiation-curable resin is formed on one of the surfaces, on which the first optical structure 3 is to be formed, of the flexible thermoplastic resin base 2. Preferably, a second optical structure 4 is formed on the other surface, opposed to the surface on which the first optical structure 3 is formed, of the flexible thermoplastic resin base 2.

9 Claims, 1 Drawing Sheet

OPTICAL SHEET MANUFACTURING METHOD AND OPTICAL SHEET

TECHNICAL FIELD

The present invention relates to a method of manufacturing an optical sheet to be employed in a projection television system and the like, and an optical sheet. More specifically, the present invention relates to a method of efficiently manufacturing a rigid optical sheet at low costs, and an optical sheet manufactured by the method.

BACKGROUND ART

The optical sheet exercises predetermined optical functions, such as a function to refract light rays such that the light rays have a peak direction parallel to a normal to the optical sheet, and a function to change a luminance distribution. The optical sheet is incorporated into a screen included in a projection television system or a microfilm reader.

A projection television system is, for example, an image display apparatus including a rear-projection screen that transmits an image projected thereon from behind and displays an enlarged image for viewing from the front side of the rear-projection screen. A general rear-projection screen employed in such a projection television system is used, in most cases, in combination with optical sheets, such as a diffusing sheet that uniformly diffuses light rays transmitted by the rear-projection screen and a lenticular lens sheet that refracts the transmitted light rays in a direction parallel to a normal to the rear-projection screen.

A lenticular lens sheet, namely, an optical sheet, for example, is provided on one of the surfaces thereof with lenses having a semicircular or semielliptic cross section. The optical sheet represented by such a lenticular lens sheet in the shape of a film is manufactured by manufacturing methods such as: (1) a T-die extrusion forming method that rapidly cools, compresses and extrudes through a T die a heated and softened transparent or semitransparent molten resin base and forms lenses in a surface of the molten resin base by imparting a lens shape formed in the circumference of a forming roll to the molten resin base; or (2) a press forming method that presses a transparent or semitransparent molten resin base with a forming die to impart a lens shape formed in a surface of the forming die to the transparent or semitransparent molten resin base to form lenses in the surface of the molten resin base. A photopolymer method such as disclosed in JP 3-127041 A is another method of manufacturing a film-shaped optical sheet. The photopolymer method spreads a radiation-curable resin on a base film, forms lenses by imparting a lens shape formed in a circumference of a forming roller to the radiation-curable resin, and cures the radiation-curable resin by irradiation with ultraviolet rays or the like.

Since the foregoing film-shaped optical sheet is not rigid, is unable to maintain its shape and is liable to deform and cannot be individually installed at a predetermined position in a projection television system or the like. Therefore, the film-shaped optical sheet needs to be installed in combination with a plate-shaped auxiliary structure, such as a rigid sheet. Large display apparatuses are demanded in recent years and large optical sheets for projection television systems and the like are used. Consequently, the importance of rigid sheet for use in combination with optical sheets has progressively grown. Although the optical sheet itself is inexpensive, the costs of the total sheet increases because the optical sheet needs an auxiliary structure, such as a rigid sheet, is difficult to install and needs additional parts.

A previously proposed rigid optical sheet, which is resistant to deformation, is formed in a big thickness to increase rigidity. Such a rigid sheet does not need any auxiliary structure and can be individually installed at a predetermined position in a projection television system or the like.

The rigid optical sheet, however, cannot be efficiently mass-produced and is costly. Although the lens sheet having a rounded surface shape like that of a lenticular lens sheet, can be formed in continuously manufacturing rigid optical sheets by extrusion, a Fresnel lens sheet and a prism structure having a sharp surface shape, and precision lens structures including a fine matte structure, a hairline structure and a diffraction grating structure cannot be formed. When an optical sheet is formed by an extrusion forming method and the molten resin base is cooled by a pair of forming rollers, the molten resin base deforms due to the contraction of the cooled resin, i.e. the returning of formation of the resin, if the molten resin base has a big thickness. Consequently, the accuracy of shaping decreases.

Therefore, the rigid optical sheet, in general, is manufactured by the following sheet-fed manufacturing method. The sheet-fed manufacturing method forms a resin base by shaping a plate with a forming die having a forming surface of a shape complementary to the sharp surface shape of a lens structure or a minute surface shape of a fine matte structure, a hairline structure or a diffraction grating structure by press forming, injection molding, UV molding (ultraviolet molding) or casting, and then removes the shaped resin base from the forming die. The sheet-fed manufacturing method manufactures resin bases at low productivity and high costs.

DISCLOSURE OF THE INVENTION

The present invention has been made in view of those problems and it is therefore an object of the present invention to provide an optical sheet manufacturing method capable of manufacturing rigid optical sheets at high productivity and low costs, and to provide an optical sheet that can be manufactured at high productivity and low costs. In this description, the word "rigid" signifies a quality resistant to the deforming effect of force. More concretely, whereas a thin base sheet of a thermoplastic resin is unable to maintain its shape, a thick base sheet of the same thermoplastic resin is resistant to deformation by external force. In this description, a quality resistant to deformation by external force is called "rigid" quality.

An optical sheet manufacturing method according to the present invention to achieve the object includes the steps of: cooling a molten thermoplastic resin base of a thermoplastic resin to obtain a flexible thermoplastic resin base having a surface temperature not higher than the glass transition point of the thermoplastic resin and an internal temperature not lower than the glass transition point thereof; coating one of the surfaces of the flexible thermoplastic resin base with a radiation-curable resin; pressing the flexible thermoplastic resin base against a radiation-curable resin shaping roller such that the radiation-curable resin coating the thermoplastic resin base is pressed against the circumference, formed in a raised die pattern, of the radiation-curable resin shaping roller and the raised die pattern formed in the circumference of the radiation-curable resin shaping roller is imparted to the surface of the radiation-curable resin to form a first optical structure having a surface shape complementary to the raised die pattern of the radiation-curable resin shaping roller; and curing the first optical structure by irradiating the first optical structure of the radiation-curable resin formed on the thermoplastic resin base with radiation.

The optical sheet manufacturing method of the present invention presses the radiation-curable resin formed on the flexible thermoplastic resin base having a surface temperature not higher than the glass transition point of the thermoplastic resin and an internal temperature not lower than the glass transition point thereof against the circumference of the radiation-curable resin shaping roller to form the first optical structure. Therefore, even if the thermoplastic resin base is thick and is rigid at a working temperature, the thermoplastic resin base can be bent so as to conform closely to the shape of the radiation-curable resin shaping roller, and the radiation-curable resin formed on the thermoplastic resin base can be precisely shaped. Thus, rigid optical sheets provided with an optical element having a sharp surface shape, such as a Fresnel lens or a prism structure, can be continuously manufactured, and the optical sheets can be manufactured at high productivity and low costs.

Preferably, the optical sheet manufacturing method of the present invention further includes the step of forming a film having high adhesion to both the thermoplastic resin and the radiation-curable resin on the surface of the flexible thermoplastic resin base on which the first optical structure is to be formed. The film makes the separation of the first optical structure formed of the radiation-curable resin from the thermoplastic resin base difficult.

In the optical sheet manufacturing method of the present invention, it is preferable that the first optical structure formed by the radiation-curable resin shaping roller has a surface shape corresponding to that of at least one of optical structures including a Fresnel lens, a lenticular lens, a prism structure, a matte structure, a hairline structure and a diffraction grating structure.

In the optical sheet manufacturing method of the present invention, it is preferable to cool the molten thermoplastic resin base by passing the molten thermoplastic resin base between a pair of cooling rollers. Preferably, the optical sheet manufacturing method of the present invention further includes the step of forming a second optical structure having a surface shape complementary to the surface shape of a raised die pattern formed on the circumference of one of the pair of cooling rollers, the one cooling roller serving as a forming roller and cooling the other surface of the flexible thermoplastic resin base opposed to the surface on which the first optical structure is formed, by imparting the surface shape of the raised die pattern of the cooling roller serving as the forming roller to the surface of the flexible thermoplastic resin base. Thus, the second optical structure having a rounded surface shape, such as a lenticular lens, can be formed in the surface of the thermoplastic resin base during the cooling of the molten thermoplastic resin base, and an optical sheet having opposite surfaces respectively provided with optical elements can be easily manufactured.

In the optical sheet manufacturing method of the present invention, it is preferable that the step of forming the first optical structure regulates the temperature of the thermoplastic resin base through the control of the temperature of the radiation-curable resin shaping roller. The optical sheet manufacturing method of the present invention may further include the step of regulating the temperature of the thermoplastic resin base separated from the radiation-curable resin shaping roller. Thus, the temperature of the thermoplastic resin base during the cooling of the thermoplastic resin base to a working temperature can be controlled, and a rigid optical sheet warped in a desired sheet and having a desired distortion can be manufactured at high productivity and low costs by properly controlling the warp or distortion of the thermoplastic resin base.

In the optical sheet manufacturing method of the present invention, it is preferable that the respective axial positions of at least either of the radiation-curable resin shaping roller and the one cooling roller serving as the forming roller are adjustable. Thus, the position of the first optical structure relative to the thermoplastic resin base can be adjusted when the first optical structure extends linearly along the length of the optical sheet, and the positional relation between the first optical structure and the second optical structure can be adjusted simply by adjusting the axial position of the radiation-curable resin shaping roller or the cooling roller serving as the forming roller when the first optical structure and the second optical structure are formed on the opposite surfaces of the thermoplastic resin base, respectively.

In the optical sheet manufacturing method of the present invention, it is preferable that the raised die pattern formed on the cooling roller serving as the forming roller has a substantially circular or elliptic cross section.

An optical sheet according to the present invention includes: a transparent, thermoplastic resin base formed of a thermoplastic resin that is rigid at a temperature not higher than a glass transition point thereof; and a first optical structure formed on one of the surfaces of the thermoplastic resin base; wherein the first optical structure is formed by shaping a material for forming the first optical structure together with the flexible thermoplastic resin base having a surface temperature not higher than the glass transition point and an internal temperature not lower than the glass transition point by a forming roller.

Since the first optical structure formed on the thermoplastic resin base of the optical sheet of the present invention is formed by shaping the material for forming the first optical structure together with the flexible thermoplastic resin base having a surface temperature not higher than the glass transition point and an internal temperature not lower than the glass transition point by the forming roller, the thermoplastic resin base can be closely wound round the forming roller even if the thermoplastic resin base is thick and is rigid at a normal working temperature, and hence the surface of the material for forming the first optical structure supplied together with the thermoplastic resin base can be precisely shaped in the shape of the first optical structure. Thus, rigid optical sheets including an optical element having a sharp surface shape, such as a Fresnel lens or a prism structure, can be continuously manufactured at high productivity and low costs.

In the optical sheet according to the present invention, it is preferable that the material forming the first optical structure is a radiation-curable resin. Preferably, the optical sheet according to the present invention further includes a film formed on a surface, on which the first optical structure is formed, of the thermoplastic resin base and having high adhesion to both the thermoplastic resin and the radiation-curable resin. Thus, the first optical structure formed of the radiation-curable resin is hardly separable from the thermoplastic resin base.

Preferably, the optical sheet according to the present invention further includes a second optical structure formed on the other surface of the flexible thermoplastic resin base opposed to the surface on which the first optical structure is formed. Preferably, the flexible thermoplastic resin base is formed by passing a molten thermoplastic resin between a pair of cooling rollers and cooling the molten thermoplastic resin by the pair of cooling rollers, and the second optical structure is formed by using one of the pair of cooling rollers, cooling the other surface of the flexible thermoplastic resin base opposed to the surface on which the first optical structure is formed as a forming roller. Thus, the second optical structure having a rounded surface shape, such as a lenticular lens, can be formed in the surface of the thermoplastic resin base during the cooling of the molten thermoplastic resin base, and an optical sheet having opposite surfaces respectively provided with optical elements can be easily manufactured.

In the optical sheet according to the present invention, it is preferable that the thermoplastic resin base has a plurality of thermoplastic resin layers. Preferably, at least one of the plurality of thermoplastic resin layers contains a diffusing material. When the thermoplastic resin base has the plurality thermoplastic resin layers, namely, two or more thermoplastic resin layers, at least one of the thermoplastic resin layers can be used as a diffusing layer, an antistatic layer, a nonantistatic layer, a conductive layer or a layer differing from the other layers in coefficient of thermal expansion or hygroscopic elongation. Thus, optical sheets respectively having different characteristics can be manufactured at high productivity and low costs.

In the optical sheet according to the present invention, it is preferable that the first optical structure includes at least one optical element selected from a group of a Fresnel lens, a lenticular lens, a prism sheet, a matte sheet, a hairline sheet and a diffraction grating sheet.

MODE FOR CARRYING OUT THE INVENTION

Preferred embodiments of the present invention will be described with reference to the accompanying drawings.

Optical Sheet

An optical sheet manufactured by an optical sheet manufacturing method in a preferred embodiment of the present invention will be described with reference to FIG. 1.

Figure 1:
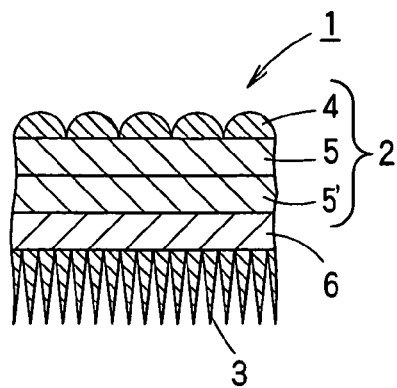
FIG. 1 is a schematic sectional view of an optical sheet manufactured by an optical sheet manufacturing method in a preferred embodiment of the present invention.

Referring to FIG. 1, an optical sheet 1 embodying the present invention includes a transparent, thermoplastic resin base 2 formed of a thermoplastic resin which is rigid at temperatures not higher than its glass transition point, and a first optical structure 3 formed on a first surface of the thermoplastic resin base 2. The first optical structure 3 is formed by supplying a material for forming the first optical structure 3 together with the thermoplastic resin base in a flexible state, in which the thermoplastic resin base has a surface temperature not higher than the glass transition point and an internal temperature not lower than the glass transition point, to a forming roller.

The thermoplastic resin base 2 is formed of the transparent thermoplastic resin. Preferably, the thermoplastic resin base 2 is a laminated structure consisting of a plurality of resin layers, such as three resin layers 4, 5 and 5' as shown in FIG. 1. the thermoplastic resin base 2 of such construction as shown in FIG. 1 has a rigidity sufficient for the optical sheet 1 to be individually installed at a predetermined position in a projection television system or the like without requiring support by an auxiliary structure, such as a rigid sheet.

The thickness of the thermoplastic resin base 2 is optionally selected from a thickness range that ensures proper rigidity for the thermoplastic resin base 2. More concretely, although it is difficult to determine a suitable thickness range definitely because a suitable thickness range is dependent on the thermoplastic resin forming the thermoplastic resin base 2 and the size of the optical sheet 1, the thickness range for the thermoplastic resin base 2 is between 1 and 5 mm, preferably, between about 1 and about 3 mm when the optical sheet 1 is supposed to be used in a projection television system of a screen size in the range of 40 to 70 in.

The resin layers 4, 5 and 5' of the thermoplastic resin base 2 are formed of transparent thermoplastic resins suitable for forming the optical sheet 1. Preferably, the thermoplastic resins forming the resin layers 4, 5 and 5' are radiation-transmitting thermoplastic resins pervious not only to visible light but also to radiations including electron beams (EBs) and ultraviolet rays (UV rays). Such suitable thermoplastic resins are, for example, acrylic resins, polycarbonate resins, vinyl chloride resins, styrene resins, olefin resins, cycloolefin resins, acrylonitrile-styrene copolymers and polyester resins.

The resin layers 4, 5 and 5' of the thermoplastic resin base 2 can be functional layers having optional functions necessary for the optical sheet 1. For example, the resin layers 4, 5 and 5' may be some of diffusing layers, transparent layers, antistatic layers, nonantistatic layers, resin layers differing from each other in coefficient of thermal expansion and hygrostatic elongation, low-reflection layers, antireflection layers, hard coating layers, conductive layers, coloring layers, selective absorption layers, polarizing layers and the like. Each of the resin layers 4, 5 and 5' can be formed of a material containing a thermoplastic resin as a principal component, and a diffusing material, a dye, a tinting material, an antistatic agent or the like. The resin layers 4, 5 and 5' may be formed of thermoplastic resins differing from each other in properties, such as coefficient of thermal expansion and hygrostatic elongation.

It is desirable that the thermoplastic resin base 2 when the thermoplastic resin base 2 is a single-layer resin sheet, or the top resin layer, such as the resin layer 4 in FIG. 1, of the thermoplastic resin base 2 when the thermoplastic resin base 2 is a multilayer resin sheet is formed of a thermoplastic resin satisfactory in scratch resistance, weather resistance and transparency, such as an acrylic resin. A preferable acrylic resin is, for example, a resin containing methyl methacrylate as a principal component. Suitable acrylic resins are methyl methacrylate polymers, copolymers of methyl methacrylate and at least one of methyl acrylate, ethyl acrylate, n-propyl acrylate, isopropyl acrylate, butyl acrylate, acrylonitrile, maleic anhydride, and styrene or α-methyl styrene, and mixtures of methyl acrylate polymer and any one of the foregoing copolymers. In most cases, an acrylic resin, a methacrylate resin or a copolymer of a methacrylate resin and a styrene resin (MS resin) is used. It is desirable that a second optical structure 4, such as a lenticular structure, can be formed in the thermoplastic resin base 2 when the thermoplastic resin base 2 is a single-layer resin sheet, or in the top resin layer, such as the resin layer 4 in FIG. 1, of the thermoplastic resin base 2 when the thermoplastic resin base 2 is a multilayer resin sheet.

When the resin layers 4, 5 and 5' of the thermoplastic resin base 2 are diffusing layers, those resin layers 4, 5 and 5' are formed of thermoplastic resins, such as acrylic resins, methacrylate resins and MS resins, containing fine particles of a diffusing material.

The particles of a diffusing material contained in the thermoplastic resin may be those of any diffusing material suitable for optical sheets. Possible particles of diffusing materials are those of organic materials including acrylic resins, acrylonitrile-styrene copolymers, melamine resins, styrene resins and silicone resins, those of inorganic materials including barium sulfate, glass, aluminum hydroxide, calcium carbonate, silica (silicon dioxide) and titanium oxide, and beads of acrylic resins, glass and MS resins. The thermoplastic resin may contain particles of one or some of those diffusing materials.

The amount of particles of the diffusing material contained in the thermoplastic resin is not subject to any limitative condition and is dependent on the difference between the thermoplastic resin and the diffusing material in refractive index and the particle size of the diffusing material. For example, when the thermoplastic resin is to be used for forming a thermoplastic resin base included in a projection screen required not to decrease contrast and to have high transmittance and the difference in refractive index between the thermoplastic resin and the diffusing material is in the range of 0.01 and 0.06 and the particle size is in the range of 3 to 20 μm, it is preferable that the thermoplastic resin base is formed of a mixture of 100 parts by weight thermoplastic resin and 0.2 to 5 parts by weight diffusing material. A resin layer having a diffusing material content below 0.2 parts by weight does not have satisfactory diffusing effect. A resin layer having a diffusing material content above 5 parts by weight has an excessively high diffusing effect and reduces the frontal brightness of the projection screen. When the thermoplastic resin is to be used for forming a thermoplastic resin base for diffusing light emitted by an illuminating device or for diffusing light to reduce the see-through of a light source for backlighting, it is preferable to increase the difference in refractive index by using particles of barium sulfate having a diffractive index different from that of an acrylic resin by about 0.15 or to increase the diffusing material content of the thermoplastic resin for forming the thermoplastic resin base.

Although the thermoplastic resin base 2 having the resin layers 4, 5 and 5' serving as diffusing layers has been described by way of example, the thermoplastic resin base 2 may be combined with a separate diffusing layer. When the resin layers 4, 5 and 5' of the thermoplastic resin base 2 are used as diffusing layers, it is desirable that at least one of the resin layers 4, 5 and 5' contain particles of diffusing material. The resin layers 4, 5 and 5' of the thermoplastic resin base 2 may contain particles of different diffusing materials in different diffusing material contents to provide the resin layers 4, 5 and 5' with different diffusing characteristics, respectively, when the two resin layers among the resin layers 4, 5 and 5' or all the resin layers 4, 5 and 5' contain particles of diffusing materials.

The number and types of the resin layers of the thermoplastic resin base 2, such as the resin layers 4, 5 and 5', are not subject to particular limitative conditions. The optical sheet 1 having desired optical characteristics can be formed by forming the thermoplastic resin base 2 in a proper combination of resin layers respectively having different optical characteristics. More concretely, the thermoplastic resin base 2 may be a composite structure represented by, for example, (diffusing layer)/(transparent layer)/(diffusing layer) and capable of preventing moiré and scintillation. The thermoplastic resin base 2 may be a composite structure represented by (highly fluidic resin layer)/(highly transparent layer)/(adhesive layer) to facilitate a shaping process for shaping the surface of the highly fluidic resin layer, such as a shaping process for forming a second optical structure 4 consisting of lenses and to enhance the adhesion of the radiation-curable resin film forming the first optical structure 3 to the adhesive layer.

Preferably, the surface, on which the first optical structure 3 is formed, of the thermoplastic resin base 2 is coated with a film 6 capable of enhancing the bond strength between the thermoplastic resin and the radiation-curable resin. Possible films as the film 6 are those of vinyl chloride resins, acrylic resins, styrene resins, polycarbonate resins, polyester-polycarbonate alloys and the like.

The first optical structure 3 is formed on the film 6 bonded to one of the surfaces of the thermoplastic resin base 2. The first optical structure 3 is formed by supplying a material for forming the first optical structure 3 together with the thermoplastic resin base 2 in a flexible state, in which the thermoplastic resin base 2 has a surface temperature not higher than the glass transition point of the thermoplastic resin and an internal temperature not lower than the glass transition point, to a forming roller. Preferably, the first optical structure 3 is formed, for example, on the surface, on the entrance side, of the thermoplastic resin base 2. The first optical structure 3 may be formed on the surface, on the exit side, of the thermoplastic resin base 2, or first optical structures may be formed on both the surfaces of the thermoplastic resin base 2, respectively.

Preferably, the first optical structure 3 is formed of a radiation-curable resin. Preferably, the radiation-curable resin is a transparent, reactive polymer or oligomer having polymerizable unsaturated bonds or epoxy groups. Possible radiation-curable resins are (meth)acrylate resins including polyester resins, polyether resins, acrylic resins, epoxy resins and urethane resins, silicon resins including siloxane resins, radical polymerizable monomers and multifunctional monomers.

Possible radical polymerizable monomers are monomers of, for example, ethyl (meth)acrylate, (meth)acrylic amide, allyl compounds, vinyl ethers, vinyl esters, vinyl heterocyclic compounds, N-vinyl compounds, styrene, (meth)acrylic acid, crotonic acid and itaconic acid. Possible multifunctional monomers are those of, for example, diethylene glycol (meth)acrylate, triethylene glycol (meth)acrylate, tetraethylene glycol (meth)acrylate, trimethylolpropane tri(meth)acrylate, pentaerythritol tetra(meth)acrylate, dipentaerythritol hexa (meth)acrylate and tris (β-(meth)acryloyl-oxyethyl) isocyanate.

The radiation-curable resin is cured by irradiation with radiation, such as electron beams (EBs) or ultraviolet rays (UV rays). The first optical structure 3 formed by shaping and curing the radiation-curable resin is firmly bonded to the thermoplastic resin base 2.

A light source that emits UV rays for curing the radiation-curable resin may be an extra-high pressure mercury lamp, a low pressure mercury lamp, a carbon arc lamp, a xenon arc lamp or a metal halide lamp. Preferably, the radiation-curable resin contains a photopolymerization initiator. Possible photopolymerization initiators are acetophenone, benzophenone, Michler's benzoyl benzoate, methyl o-benzoyl benzoate, aldoxime, tetramethylthiuram monosulfide, thioxanthone and/or photosensitizers including n-butylamine, triethylamine and tributyl phosphine.

Electron beams for curing the radiation-curable resin may be emitted by an electron beam radiating device of a Cockcroft-Walton type, a Van de Graaff type, a resonant transformer type, an insulation core transformer type, a linear type, an electrocurtain type, a dynamitron type or a high-frequency type. The energy of electron beams for curing the radiation-curable resin is, for example, in the range of 50 to 1000 keV.

The first optical structure 3 may be of any type, provided that the optical element is suitable for the optical sheet. Preferably, the first optical structure 3 is a Fresnel lens, a lenticular lens consisting of lenticules, a prism structure consisting of prisms, a matte structure, a hairline strucrure or a diffraction grating structure. More concretely, the first optical structure 3 is a circular Fresnel lens, a linear Fresnel lens, a total-reflection Fresnel lens, a triangular prism structure consisting of prisms having a triangular cross section, a polygonal prism structure consisting of prisms having a polygonal cross section, a lenticular lens consisting of lenticules, a sand-blast matte structure, a rectangular diffraction grating structure, a holographic structure or a moth eye structure. FIG. 1 shows a Fresnel lens formed on the surface, on the entrance side, of the thermoplastic resin base 2 as the first optical structure 3 by way of example. The Fresnel lens has triangular prisms arranged on the surface, on the entrance side, of the thermoplastic resin base 2 and each having an entrance facet and a total reflection facet that reflects part or the entire light incident on the entrance facet in a desired direction.

When the first optical structure 3 is formed on one of the surfaces, such as the surface on the entrance side, of the resin base 2, the other surface of the thermoplastic resin base 2 may be either exposed or coated with a screening layer to improve contrast or provided with the second optical structure 4, such as a lenticular structure, as shown in FIG. 1.

Although the second optical structure 4 may be formed by a method similar to the foregoing method of forming the first optical structure 3, it is preferable that the second optical structure 4 is formed while the thermoplastic resin base 2 is in a state in which the thermoplastic resin base 2 is cooled and is flexible. The flexible thermoplastic resin base 2 can be obtained by cooling the molten thermoplastic resin base 2 in a molten state by passing the molten thermoplastic resin base 2 between a pair of cooling rollers. One of the pair of cooling rollers, cooling the other surface of the flexible thermoplastic resin base 2 opposed to the surface on which the first optical structure 3 is formed may be used as a forming roller for forming the second optical structure 4. The second optical structure 4 having a surface shape complementary to that of the forming roller can be formed by transferring the surface shape of the forming roller to the surface of the thermoplastic resin base 2.

Since the lenses that can be surely formed by the foregoing method of forming the second optical structure 4 have a gently curved surface shape, it is preferable that the second optical structure 4 is a lenticular lens having a comparatively gently curved surface shape. The shape of the lenticular lens is not subject to any particular limitative condition. For example, it is preferable that the lenticular lens is formed by arranging lenticules having a curved cross section, such as one of a semicircular cross section, a semielliptic cross section, a parabolic cross section, a hyperbolic cross section, a trigonometric cross section, a combination of some of those cross sections and cross sections defined by lines tangent to those cross sections, e.g. trapezoidal cross sections, at pitches not smaller than 30 µm, preferably, not smaller than 60 µm. Preferable ones of the foregoing cross sections do not have any singular point and facilitate forming a draft in a forming die. A lenticular lens as the second optical structure 4 refracts and reflects light to diffuse light on the exit surface of the optical sheet 1 and deflects light obliquely fallen thereon in a direction perpendicular to the exit surface of the optical sheet 1.

Since the optical sheet 1 in this embodiment is rigid and has the first optical structure 3, namely, a precision lens structure, the optical sheet 1 is effectively applicable to an optical axis correcting sheet for backlighting, a sheet for natural lighting or illumination, a hologram sheet, a nonglare sheet, a precision matte sheet, a louver, a linear Fresnel lens sheet and a prism sheet. The optical sheet 1 in this embodiment can be continuously manufactured. If the first optical structure 3 has the shape of a pattern of an arrangement of linear lenses, the optical sheet 1 can be continuously manufactured in a long sheet. Thus, the optical sheet 1 can be formed in a large size, which is very high in industrial value.

Optical Sheet Manufacturing Method

A manufacturing method of manufacturing the optical sheet 1 will be concretely described.

Figure 2:
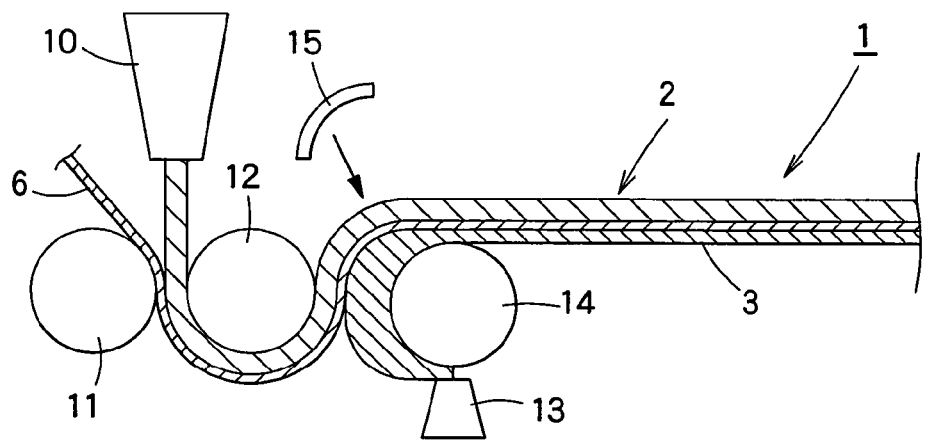
FIG. 2 is a schematic, fragmentary view of an optical sheet manufacturing apparatus for carrying out the optical sheet manufacturing method in the preferred embodiment of the present invention.

FIG. 2 shows a manufacturing apparatus for carrying out the optical sheet manufacturing method of manufacturing the optical sheet 1 by way of example in a schematic, fragmentary view. Referring to FIG. 2, the manufacturing apparatus includes, as principal components, a T die 10, a first roller 11, a second roller 12, a radiation-curable resin applying device 13, a radiation-curable resin shaping roller 14 and a radiation device 15. The first roller 11 and the second roller 12 are paired and function as cooling rollers.

A molten thermoplastic resin is extruded continuously through the die opening of the T die 10 in a thermoplastic resin sheet of a predetermined thickness, and the thermoplastic resin sheet is delivered continuously to the first roller 11 and the second roller 12. Preferably, the T die 10 can be used for multilayer extrusion so that the T die 10 may be used for forming the thermoplastic resin base 2 when the thermoplastic resin base 2 is a multilayer sheet having multiple layers including the resin layer 5.

The first roller 11 and the second roller 12 are disposed opposite to each other. The first roller 11 and the second roller 12 compress the thermoplastic resin base 2 extruded through the die opening of the T die 10 and cool the thermoplastic resin base 2 such that the thermoplastic resin base 2 has a surface temperature not higher than the glass transition point of the thermoplastic resin forming the thermoplastic resin base 2 and an internal temperature not lower than the glass transition point.

Either of the first roller 11 and the second roller 12, for example, the second roller 12 in this embodiment, serves as a forming roller capable of forming the second optical structure 4 in a surface of the thermoplastic resin base 2.

The second roller 12, namely, the forming roller, is provided in its circumference with a raised die pattern having a surface shape complementary to that of a desired lens structure. More concretely, when the optical sheet 1 shown in FIG. 1 is manufactured, the circumference of the second roller 12 is shaped in a surface shape complementary to that of a lenticular lens having lenticules. The second roller 12 is provided in its circumference with axially arranged circumferential grooves having a cross section of a shape corresponding to that of the lenticules. The circumference, provided with such circumferential grooves, of the second roller 12 is pressed against the surface of the thermoplastic resin base 2 to emboss the second optical structure 4 in the surface of the thermoplastic resin base 2.

There is not any particular restriction on the sectional shape of the circumferential grooves of the second roller 12 serving as a forming roller. The circumferential grooves may be of any cross-sectional shape, such as a cross-sectional shape substantially resembling a circle or an ellipse. Preferably, the second roller 12 serving as a forming roller is axially movable and the position of the second roller 12 relative to the thermoplastic resin base 2 is adjustable.

Preferably, the thermoplastic resin base 2 passing between the first roller 11 and the second roller 12 is tensioned by a take-up roller, not shown, disposed at the downstream of the radiation-curable resin shaping roller 14 so that the thermoplastic resin base 2 may be closely wound round a part of the second roller 12, for example, half the circumference of the second roller 12, as shown in FIG. 2. The contact range in the circumference of the second roller 12 in contact with the thermoplastic resin base 2 is not subject to any limitative condition, provided that the shape of the raised die pattern formed in the circumference of the second roller 12 can be imparted to the surface of the thermoplastic resin base 2.

The radiation-curable resin shaping roller 14 forms the first optical structure 3 in the thermoplastic resin base 2 separated from the second roller 12 serving as a forming roller. The circumference of the radiation-curable resin shaping roller 14 has a surface shape complementary to that of a desired lens structure. More concretely, to form an optical sheet 1 as shown in FIG. 1, the radiation-curable resin shaping roller 14 is provided on its circumference with a lens forming die for forming a Fresnel lens. The lens forming die has axially arranged circumferential grooves having a cross section complementary to that of the lens elements of the Fresnel lens. The radiation-curable resin film formed on the surface, in contact with the first roller 11, of the thermoplastic resin base 2 is pressed against part of the circumference, provided with the lens forming die, of the radiation-curable resin shaping roller 14 to impart the surface shape of the lens forming die of the radiation-curable resin shaping roller 14 to the surface of the radiation-curable resin film to form the first optical structure 3.

The circumferential grooves having the cross section complementary to that of the lens elements and formed in the circumference of the radiation-curable resin shaping roller 14 do not necessarily need to be axially arranged, but may be oblique or horizontal. However, it is preferable to arrange the circumferential grooves axially to facilitate the separation of the first optical structure 3 from the radiation-curable resin shaping roller 14.

The sectional shape of the circumferential grooves of the lens die formed on the circumference of the radiation-curable resin shaping roller 14 is not subject to any limitative condition and may be any shape. For example, the sectional shape of the circumferential grooves may be a triangular shape, a rectangular shape, a polygonal shape, a circular shape, an elliptic shape or a shape resembling those shapes. The circumferential grooves corresponding to the lens elements may be partly or totally different from each other in pitch and/or shape or may be randomly arranged like holographic interference fringes.

Preferably, the radiation-curable resin shaping roller 14 is axially movable and the position of the radiation-curable resin shaping roller 14 relative to the thermoplastic resin base 2 is adjustable. Thus, the respective positions of the first optical structure 3 and the second optical structure 4 formed respectively on the opposite surfaces of the thermoplastic resin base 2 can be adjusted when necessary.

Preferably, the temperature of the radiation-curable resin shaping roller 14 can be controlled to regulate the temperature of the thermoplastic resin base 2. Thus, the rigid optical sheet 1 having a desired warp or a desired distortion can be manufactured at high productivity and low costs by properly controlling the warp or distortion of the thermoplastic resin base 2.

A radiation-curable resin application device, such as a coating die 13, is disposed near the circumference of the radiation-curable resin shaping roller 14. The coating die 13 feeds the radiation-curable resin at a feed rate suitable for forming the first optical structure 3. More concretely, the coating die 13 feeds the radiation-curable resin onto the radiation-curable resin shaping roller 14, or onto the surface, in contact with the first roller 11, of the thermoplastic resin base 2, or onto the portion of the surface of the thermoplastic resin base 2, placed between the first roller 11 and the radiation-curable resin shaping roller 14.

The radiation-curable resin film thus red by the coating die 13 is compressed between the thermoplastic resin base 2 and the circumference of the radiation-curable resin shaping roller 14, the shape of the lens forming die of the radiation-curable resin shaping roller 14 is imparted to the surface of the radiation-curable resin film to form the lens elements of the first optical structure 3.

The radiation device 15 irradiates the radiation-curable resin filling up the lens forming die of the radiation-curable resin shaping roller 14 with radiation, such as electron beams (EBs) or ultraviolet rays (UV rays). The radiation-curable resin film is irradiation with radiation through the thermoplastic resin base 2 for curing at a downstream position of a position where the lens forming die is filled up with the radiation-curable resin and the thermoplastic resin base 2 has not yet been separated from the radiation-curable resin shaping roller 14 (the lens elements have been formed).

The radiation device 15 may be of any type provided that the radiation device 15 is able to cure the radiation-curable resin. The radiation device 15 may be a UV radiating device provided with a light source capable of emitting UV rays, such as a high-pressure mercury lamp, a carbon arc lamp, a xenon arc lamp or a metal halide lamp, or an electron beam radiating device of a Cockcroft-Walton type, a Van de Graaff type, a resonant transformer type, an insulation core transformer type, a linear type, an electrocurtain type, a dynamitron type or a high-frequency type.

A temperature regulating device, not shown, may be disposed at the downstream of the radiation-curable resin shaping roller 14 to regulate the temperature of the thermoplastic resin base 2 separated from the radiation-curable resin shaping roller 14. The temperature regulating device may be of any type provided that the temperature regulating device is capable of regulating the temperature of the thermoplastic resin base 2 (cooling the thermoplastic resin base 2) from the both sides of the thermoplastic resin base 2. Preferably, the temperature regulating device is provided with cooling rollers, cooling fans or a thermal insulation gage and is capable of cooling the thermoplastic resin base 2 to a temperature not higher than the glass transition point of the thermoplastic resin while regulating the respective temperatures of the both surfaces of the thermoplastic resin base 2 such that the thermoplastic resin base 2 has a desired distortion. The warp or distortion of the thermoplastic resin base 2 can be properly controlled and the rigid optical sheet 1 having a desired warp or a desired distortion can be manufactured at high productivity and low costs.

Description will be made of an optical sheet manufacturing method of manufacturing the optical sheet 1 shown in FIG. 1, using the optical sheet manufacturing apparatus shown in FIG. 2.

The molten thermoplastic resin is extruded through the T die 10 to pass the molten thermoplastic resin base 2 continuously between the first roller 11 and the second roller 2 serving as a forming roller. When the thermoplastic resin is an acrylic resin, a polycarbonate resin, a vinyl chloride resin, a styrene resin, an olefin resin, a cycloolefin resin, an acrylonitrile-styrene copolymer or a polyester resin, the thermoplastic resin is melted by heating at a temperature between 200 and 280° C.

Suppose that the thermoplastic resin base 2 is formed of an acrylic resin. Then, the acrylic resin is melted by heating at a temperature between 240 and 250° C., the molten acrylic resin is extruded through the die opening of the T die 10 in an acrylic resin sheet of a predetermined thickness and the acrylic resin sheet is passed continuously between the first roller 11 and the second roller 12. When the thermoplastic resin base 2 is a multilayer resin sheet having two or more component resin layers, resins are extruded through the die opening of the T die 10 for multilayer extrusion molding.

When the film 6 having high adhesion to both the thermoplastic resin and the radiation-curable resin is bonded to the surface, on which the first optical structure 3 is to be formed, of the thermoplastic resin base 2, the film 6 is fed continuously to the joint of the molten thermoplastic resin base 2 extruded from the T die 10 and the first roller 11.

The molten thermoplastic resin base 2 is cooled in a flexible state, in which the thermoplastic resin base 2 has a surface temperature not higher than the glass transition point of the thermoplastic resin and an internal temperature not lower than the glass transition point, by passing the molten thermoplastic resin base 2 between the first roller 11 and the second roller 12. The respective temperatures of the first roller 11 and the second roller 12 are adjusted individually in the range of 50 to 100° C. When the thermoplastic resin base 2 is formed of an acrylic resin, an acrylic resin sheet is formed by passing the molten acrylic resin of a temperature between 240 and 250° C. extruded through the die opening of the T die 10 between the first roller 11 at 65° C. and the second roller 12 at 65° C. Then, the acrylic resin sheet is cooled by the first roller 11 and the second roller 12 such that the acrylic resin sheet has a surface temperature not higher than the glass transition temperature of the acrylic resin between 80 and 90° C. (for example, 87° C.) and an internal temperature between 90 and 250° C. not lower than the glass transition point. Although it is practically impossible to measure the internal temperature and the internal temperature cannot be determined, it is obvious that the internal temperature is not lower than the glass transition point because the acrylic resin sheet is not distorted when the same is cooled by the first roller 11 and the second roller 12. The glass transition point of the acrylic resin is in the range of 90 to 100° C., for example 98° C.

The thermoplastic resin base 2 is compressed between the first roller 11 and the second roller 12 such that the thermoplastic resin base 2 is in close contact with a part of the circumference of the second roller 12. Consequently, the surface shape of the raised die pattern of the second roller 2 serving as a forming roller is imparted to the surface of the thermoplastic resin base 2 to form the lenticules of the second optical structure 4. Although the first roller 11 can be used as a forming roller, it is preferable to use the second roller 12 as a forming roller because shaping ratio can be easily increased when the second roller 12 is used as a forming roller. The second optical structure 4 having a surface shape, such as the surface shape of a lenticular lens consisting of lenticules having a semicircular cross section, complementary to the surface shape of the raised die pattern is formed in the surface of the thermoplastic resin base 2.

The flexible thermoplastic resin base 2 separated from the second roller 12, serving as a forming roller, and having a surface temperature not higher than the glass transition point and an internal temperature not lower than the glass transition point comes into contact with the radiation-curable resin shaping roller 14. The radiation-curable resin extruded through the coating die 13 disposed near the circumference of the radiation-curable resin shaping roller 14 is applied to the surface, opposed to the surface on which the second optical structure 4 is formed, of the thermoplastic resin base 2, in a radiation-curable resin film. The radiation-curable resin film formed on the thermoplastic resin base 2 is pressed against a part of the radiation-curable resin shaping roller 14. Since the surfaces of the thermoplastic resin base 2 at a temperature not higher than the glass transition point are rigid, the surface shape of the radiation-curable resin film shaping roller 14 can be surely imparted to the surface of the radiation-curable resin film to form the first optical structure 3 having a surface shape complementary to that of a raised die pattern formed in the circumference of the radiation-curable resin shaping roller 14, such as the surface shape of a Fresnel lens including ridges having a triangular cross section.

The first optical structure 3 formed on the thermoplastic resin base 2 is irradiated with radiation, such as UV rays, by the radiation device 15 before the first optical structure is separated from the radiation-curable resin shaping roller 14. The radiation reaches the first optical structure 3 through the thermoplastic resin base 2 to cure the radiation-curable resin forming the first optical structure 3. Thus, the first optical structure 3 of the radiation-curable resin is bonded directly or through the film 6 to the thermoplastic resin base 2. The first optical structure 3 is not easily separable from the thermoplastic resin base 2.

The first optical structure 3 firmly bonded to the thermoplastic resin base 2 is separated from the radiation-curable resin shaping roller 14. The optical sheet 1 thus fabricated is transferred to the next process.

The optical sheet manufacturing method in this embodiment presses the elastic thermoplastic resin base 2 having a surface temperature not higher than the glass transition point and an internal temperature not lower than the glass transition point, with the radiation-curable resin film being in contact with the circumference of the radiation-curable resin shaping roller 14 to form the first optical structure 3. Therefore, the flexible thermoplastic resin base 2, which is rigid at a working temperature, can be satisfactorily closely wound round the radiation-curable resin shaping roller 14. Since the first optical structure 3 is formed of the radiation-curable resin, such as a UV-curable resin, the first optical structure 3 has a stable surface, the radiation-curable resin does not remain on the radiation-curable resin shaping roller 14, and the first optical structure 3 will not be distorted when the same is separated from the radiation-curable resin shaping roller 14. Therefore, precision lens elements can be formed by imparting the raised die pattern of the radiation-curable resin shaping roller 14 to the radiation-curable resin film formed on the surface of the thermoplastic resin base 2. Thus, the optical sheet manufacturing method is capable of continuously manufacturing rigid optical sheets 1 provided with an optical structure having a sharp shape, such as a Fresnel lens or a prism structure, at high productivity and at manufacturing costs lower than that at which a sheet-fed optical sheet manufacturing method manufactures optical sheets. The optical sheet manufacturing method in this embodiment is capable of continuously manufacturing optical sheets 1 and of forming a lens structure of a desired long length provided that the lens structure can be formed by the radiation-curable resin shaping roller 14. Thus, the optical sheet manufacturing method is applicable to the manufacture of a large optical sheet and has a very high industrial value.

The optical sheet manufacturing method in this embodiment using either of the first roller 11 and the second roller 12 serving as cooling rollers for cooling the thermoplastic resin base 2, as a forming roller, is capable of precisely and easily forming the lens structures, namely, the first optical structure 3 and the second optical structure 4, on both the surfaces of the thermoplastic resin base 2, respectively. When lens structures are formed on both the surfaces of a thermoplastic resin base having the shape of a flat sheet by press working by the conventional optical sheet manufacturing method, the position of the thermoplastic resin base with respect to two axis, namely, the x-axis and the y-axis, must be adjusted so that the lens structures are aligned with each other when one of the optical structure is formed after the other optical structure has been formed. The optical sheet manufacturing method in this embodiment uses the second roller 12 and the radiation-curable resin shaping roller 14 as forming rollers to form the lens structures on both the surfaces of the thermoplastic resin base 2. Therefore, the longitudinal positional adjustment of the thermoplastic resin base 2 can be simply achieved, for example, by previously determining the longitudinal position of the radiation-curable resin shaping roller 14. The correction of the dislocation of the two lens structures, namely, the first optical structure 3 and the second optical structure 4, formed on both the surfaces of the thermoplastic resin base 2 can be simply achieved by axially moving the second roller 12 used as the forming roller and/or the radiation-curable resin shaping roller 14. The two lens structures, namely, the first optical structure 3 and the second optical structure 4, can be accurately and simply formed on both the surfaces of the thermoplastic resin base 2, respectively.

Since the film 6 highly adhesive to both the thermoplastic resin and the radiation-curable resin is sandwiched between the thermoplastic resin base 2 and the first optical structure 3, the first optical structure 3 can be firmly bonded to the thermoplastic resin base 2 so that the first optical structure 3 is hardly separable from the thermoplastic resin base 2. The film 6 prevents the drop of the surface temperature of the thermoplastic resin base 2 when the radiation-curable resin film for forming the first optical structure 3 comes into contact with the surface of the thermoplastic resin base 2 and hence no attention needs to be paid to the rigidity of the surface of the thermoplastic resin base 2. Consequently, the radiation-curable resin for forming the first optical structure 3 can be easily selected. If the film 6 is a diffusing film or a film having various optical functions, the optical sheet 1 having various optical functions can be obtained.

The optical sheet manufacturing method in this embodiment using the optical sheet manufacturing apparatus shown in FIG. 2 cools the molten thermoplastic resin base 2 to a predetermined thermal condition where the thermoplastic resin base 2 has a surface temperature not higher than the glass transition point of the thermoplastic resin forming the thermoplastic resin base 2 and an internal temperature not lower than the glass transition point. The optical sheet manufacturing apparatus may be additionally provided with one or a plurality of cooling rollers in addition to the first roller 11 and the second roller 12, namely, the two cooling rollers. An optical sheet manufacturing apparatus shown in FIG. 3 includes a T die 10, a first cooling roller 20, a second cooling roller 21, and a third cooling roller 22 disposed at the downstream of the second cooling roller 21. The first cooling roller 20 and the second cooling roller 21 cool a thermoplastic resin base 2 extruded through the die openings of the T die 10, and the third cooling roller 22 cools the thermoplastic resin base 2 cooled by the first cooling roller 20 and the second cooling roller 21. More concretely, the thermoplastic resin base 2 extruded through the T die 10 is wound round a part of the circumference, for example, about half the circumference, of the cooling roller 21 with one of the surfaces thereof being in close contact with the circumference of the cooling roller 21 for cooling. After the thermoplastic resin base 2 has been separated from the cooling roller 21, the thermoplastic resin base 2 is wound round a part of the circumference, for example, about half the circumference, of the cooling roller 22 with the other surface thereof, namely, the surface opposite the surface, on which a first optical structure 3 is to be formed, being in close contact with the circumference of the cooling roller 22 for cooling. The third cooling roller 22, similarly to the second roller 12 of the optical sheet manufacturing apparatus shown in FIG. 2, is used also as a forming roller.

Since the thermoplastic resin base 2 is wound round the cooling rollers 21 and 22 such that both the surfaces of the thermoplastic resin base 2 are in close contact with parts of the circumferences, for example, about half the circumferences, of the cooling rollers 21 and 22, respectively, the surfaces and the interior of the thermoplastic resin base 2 can be more surely cooled, and the interior temperature of the thermoplastic resin base 2 can be more precisely controlled.

In the optical sheet manufacturing apparatus shown in FIG. 2, the thermoplastic resin base 2 is in contact with the second roller 12 serving also as a forming roller for a comparatively long time and is in contact for a comparatively short time with the second roller 11 and is separated from the second roller 11 soon after the same has come into contact with the second roller 12. Therefore, although the surfaces of the thermoplastic resin base 2 can be adjusted to a surface temperature not higher than the glass transition point, it is difficult to adjust the interior of the thermoplastic resin base 2 at a desired internal temperature not lower than the glass transition point. On the other hand, in the optical sheet manufacturing apparatus shown in FIG. 3, the thermoplastic resin base 2 is cooled by the three cooling rollers 20, 21 and 22 and the thermoplastic resin base 2 is in contact with the circumferences of the two cooling rollers 21 and 22 for a comparatively ling time. Thus, the interior of the thermoplastic resin base 2 can be easily adjusted to a desired internal temperature.

Thus, the internal temperature of the thermoplastic resin base 2 can be adjusted so that the thermoplastic resin base 2 can be surely brought into close contact with the circumference of the radiation-curable resin shaping roller 14. Consequently, the accurate lens structure can be surely formed in the surface of the radiation-curable resin film. When the cooling roller 21 is used also as a forming roller, a lens structure formed by imparting the raised die pattern of the radiation-curable resin shaping roller 14 can be superposed on a lens structure formed by imparting the raised die pattern of the cooling roller 21. The feed of the radiation-curable resin through the coating die 13 onto the thermoplastic resin base 2 and the deaeration of the radiation-curable resin can be easily achieved.

Figure 3:
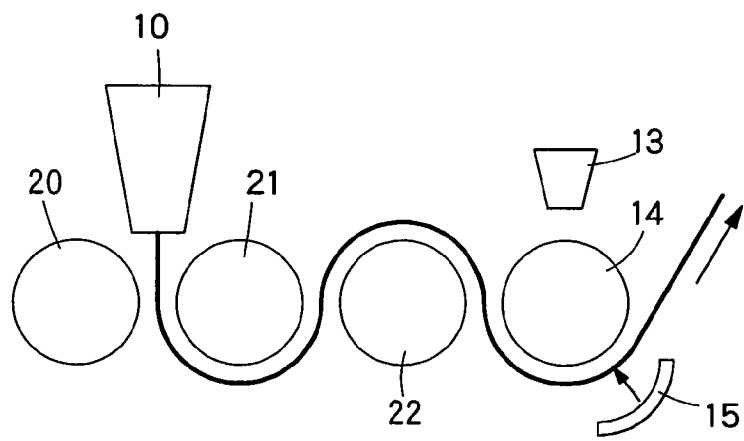
FIG. 3 is a schematic, fragmentary view of another optical sheet manufacturing apparatus for carrying out an optical sheet manufacturing method in a preferred embodiment of the present invention.

The interior of the thermoplastic resin base 2 separated from the radiation-curable resin shaping roller 14 is adjusted to an internal temperature not lower than the glass transition point by controlling the temperatures of the rollers 11, 12, 14, 20, 21 and 22 of the optical sheet manufacturing apparatuses shown in FIGS. 2 and 3, and the thermoplastic resin base 2 straightened after being separated from the radiation-curable resin shaping roller 14 is cooled from the opposite sides by a temperature adjusting device, not shown, so that the interior of the thermoplastic resin base 2 may be cooled to an internal temperature not higher than the glass transition point. Thus, rigid optical sheets 1 having neither a warp nor a distortion can be continuously manufactured. Rigid optical sheets 1 having a desired warp or a desired distortion can be continuously manufactured by cooling the thermoplastic resin base 2 by the temperature adjusting device, not shown, such that the opposite surfaces of the thermoplastic resin base 2 have different surfaces temperatures, respectively.

The invention claimed is:

1. A method of manufacturing an optical sheet, said method comprising the steps of:

cooling a molten thermoplastic resin base of a thermoplastic resin to obtain a flexible thermoplastic resin base having a surface temperature not higher than a glass transition point of the thermoplastic resin and an internal temperature not lower than the glass transition point thereof;

coating a surface of the flexible thermoplastic resin base with a radiation-curable resin;

pressing the flexible thermoplastic resin base against a radiation-curable resin shaping roller such that the radiation-curable resin coating the thermoplastic resin base is pressed against a circumference, formed in a raised die pattern, of the radiation-curable resin shaping roller and the raised die pattern formed in the circumference of the radiation-curable resin shaping roller is imparted to the surface of the radiation-curable resin to form a first optical structure having a surface shape complementary to the raised die pattern of the radiation-curable resin shaping roller; and curing the first optical structure by irradiating the first optical structure of the radiation-curable resin formed on the thermoplastic resin base with radiation.

2. The method according to claim 1, further comprising a step of forming a film having high adhesion to both the thermoplastic resin and the radiation-curable resin on a surface of the flexible thermoplastic resin base on which the first optical structure is to be formed.

3. The method according to claim 1, wherein the first optical structure formed by the radiation-curable resin shaping roller has a surface shape corresponding to that of at least one of optical structures including a Fresnel lens, a lenticular lens, a prism structure, a matte structure, a hairline structure and a diffraction grating structure.

4. The method according to claim 1, wherein the molten thermoplastic resin base is cooled by passing the molten thermoplastic resin base between a pair of cooling rollers.

5. The method according to claim 4, further comprising a step of forming a second optical structure having a surface shape complementary to a surface shape of a raised die pattern formed on a circumference of one of the pair of cooling rollers, one cooling roller serving as a forming roller and cooling the other surface of the flexible thermoplastic resin base opposed to a surface on which the first optical structure is formed, by imparting the surface shape of the raised die pattern of the cooling roller serving as the forming roller to the surface of the flexible thermoplastic resin base.

6. The method according to claim 1, wherein the step of forming the first optical structure regulates a temperature of the thermoplastic resin base through a control of a temperature of the radiation-curable resin shaping roller.

7. The method according to claim 1, further comprising a step of regulating a temperature of the thermoplastic resin base separated from the radiation-curable resin shaping roller.

8. The method according to claim 5, wherein the respective axial positions of at least either of the radiation-curable resin shaping roller and the one cooling roller serving as the forming roller are adjustable.

9. The method according to claim 5, wherein the raised die pattern formed on the cooling roller serving as the forming roller has a pattern element having a substantially circular or elliptic cross section.

* * * * *